United States Patent
Seo et al.

(10) Patent No.: US 7,809,250 B2
(45) Date of Patent: Oct. 5, 2010

(54) RECORDING MEDIUM HAVING A DATA STRUCTURE FOR MANAGING REPRODUCTION OF GRAPHIC DATA AND RECORDING AND REPRODUCING METHODS AND APPARATUSES

(75) Inventors: Kang Soo Seo, Kyunggi-do (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1096 days.

(21) Appl. No.: 10/673,212

(22) Filed: Sep. 30, 2003

(65) Prior Publication Data

US 2004/0067041 A1    Apr. 8, 2004

(30) Foreign Application Priority Data

Oct. 2, 2002    (KR) ............... 10-2002-0060256

(51) Int. Cl.
- *H04N 5/00* (2006.01)
- *H04N 9/00* (2006.01)
- *H04N 11/00* (2006.01)
- *H04N 9/79* (2006.01)
- *H04N 5/91* (2006.01)
- *H04N 7/00* (2006.01)

(52) U.S. Cl. .............. 386/125; 386/1; 386/45; 386/46; 386/126

(58) Field of Classification Search ............. 386/1, 386/45, 46, 125–126
See application file for complete search history.

(56) References Cited

U.S. PATENT DOCUMENTS

| | | | |
|---|---|---|---|
| 4,439,759 A | 3/1984 | Fleming et al. | |
| 5,539,716 A | 7/1996 | Furuhashi | |
| 5,636,631 A | 6/1997 | Waitz et al. | |
| 5,748,256 A | 5/1998 | Tsukagoshi | |
| 5,758,007 A | 5/1998 | Kitamura et al. | |
| 5,841,447 A | 11/1998 | Drews | |
| 5,862,300 A | 1/1999 | Yagasaki et al. | |
| 5,912,710 A * | 6/1999 | Fujimoto | 348/445 |
| 5,917,830 A | 6/1999 | Chen et al. | |
| 5,923,627 A * | 7/1999 | Miwa et al. | 386/70 |
| 5,929,857 A | 7/1999 | Dinallo et al. | |
| 5,963,704 A | 10/1999 | Mimura et al. | |
| 5,999,160 A | 12/1999 | Kitamura et al. | |

(Continued)

FOREIGN PATENT DOCUMENTS

CN    1151586    6/1997

(Continued)

OTHER PUBLICATIONS

International Search Report, Jan. 16, 2004.

(Continued)

*Primary Examiner*—Thai Tran
*Assistant Examiner*—Daquan Zhao
(74) *Attorney, Agent, or Firm*—Harness, Dickey & Pierce

(57) ABSTRACT

The recording medium includes a graphic information area having at least one graphic image information segment and at least one palette information segment recorded therein. Each palette information segment provides color information. Each graphic image information segment provides reproduction information for reproducing one or more graphic images.

26 Claims, 13 Drawing Sheets

U.S. PATENT DOCUMENTS

| | | | |
|---|---|---|---|
| 6,009,234 A | 12/1999 | Taira et al. | |
| 6,035,055 A | 3/2000 | Wang et al. | |
| 6,044,408 A * | 3/2000 | Engstrom et al. | 719/328 |
| 6,046,778 A | 4/2000 | Nonomura et al. | |
| 6,072,832 A | 6/2000 | Katto | |
| 6,088,507 A | 7/2000 | Yamauchi et al. | |
| 6,112,011 A * | 8/2000 | Hisatomi | 386/98 |
| 6,115,529 A | 9/2000 | Park | |
| 6,134,383 A | 10/2000 | Kikuchi et al. | |
| 6,167,189 A | 12/2000 | Taira et al. | |
| 6,167,192 A | 12/2000 | Heo | |
| 6,167,410 A | 12/2000 | Imamura | |
| 6,204,883 B1 | 3/2001 | Tsukagoshi | |
| 6,226,446 B1 | 5/2001 | Murase et al. | |
| 6,233,393 B1 | 5/2001 | Yanagihara et al. | |
| 6,246,402 B1 | 6/2001 | Setogawa et al. | |
| 6,246,790 B1 | 6/2001 | Huang et al. | |
| 6,286,001 B1 | 9/2001 | Walker et al. | |
| 6,330,210 B1 | 12/2001 | Weirauch et al. | |
| 6,335,742 B1 | 1/2002 | Takemoto | |
| 6,366,732 B1 | 4/2002 | Murase et al. | |
| 6,393,196 B1 | 5/2002 | Yamane et al. | |
| 6,430,311 B1 | 8/2002 | Kumada | |
| 6,433,801 B1 | 8/2002 | Moon et al. | |
| 6,445,877 B1 | 9/2002 | Okada et al. | |
| 6,470,460 B1 | 10/2002 | Kashiwagi et al. | |
| 6,483,983 B1 | 11/2002 | Takahashi et al. | |
| 6,504,996 B1 | 1/2003 | Na et al. | |
| 6,539,166 B2 | 3/2003 | Kawamura et al. | |
| 6,546,188 B1 | 4/2003 | Ishii et al. | |
| 6,553,180 B1 | 4/2003 | Kikuchi et al. | |
| 6,574,417 B1 | 6/2003 | Lin et al. | |
| 6,707,459 B1 | 3/2004 | Graves et al. | |
| 6,711,287 B1 | 3/2004 | Iwasaki | |
| 6,724,981 B1 | 4/2004 | Park et al. | |
| 6,728,477 B1 | 4/2004 | Watkins | |
| 6,754,435 B2 | 6/2004 | Kim | |
| 6,792,154 B1 | 9/2004 | Stewart | |
| 6,847,777 B1 | 1/2005 | Nakamura | |
| 6,850,228 B1 * | 2/2005 | Parks et al. | 345/173 |
| 6,871,008 B1 * | 3/2005 | Pintz et al. | 386/95 |
| 6,889,001 B1 | 5/2005 | Nikaido et al. | |
| 7,072,401 B2 | 7/2006 | Kim et al. | |
| 7,167,637 B2 | 1/2007 | Mori et al. | |
| 7,236,687 B2 | 6/2007 | Kato et al. | |
| 2001/0036322 A1 | 11/2001 | Bloomfield et al. | |
| 2001/0052127 A1 | 12/2001 | Seo et al. | |
| 2002/0006165 A1 | 1/2002 | Kato | |
| 2002/0006273 A1 | 1/2002 | Seo et al. | |
| 2002/0089516 A1 | 7/2002 | Sobol | |
| 2002/0145702 A1 | 10/2002 | Kato et al. | |
| 2002/0174430 A1 | 11/2002 | Ellis et al. | |
| 2002/0194618 A1 | 12/2002 | Okada et al. | |
| 2003/0152365 A1 | 8/2003 | Nagayama | |
| 2003/0179900 A1 | 9/2003 | Tian et al. | |
| 2004/0047591 A1 | 3/2004 | Seo et al. | |
| 2005/0045481 A1 | 3/2005 | Kawaguchi et al. | |
| 2006/0045481 A1 | 3/2006 | Yahata et al. | |
| 2006/0064716 A1 | 3/2006 | Sull et al. | |
| 2006/0143666 A1 | 6/2006 | Okada et al. | |
| 2006/0153535 A1 | 7/2006 | Chun et al. | |
| 2006/0165388 A1 | 7/2006 | Uesaka et al. | |
| 2006/0188223 A1 | 8/2006 | Ikeda et al. | |
| 2006/0282775 A1 | 12/2006 | Yahata et al. | |
| 2007/0057969 A1 | 3/2007 | McCrossan et al. | |
| 2007/0133948 A1 | 6/2007 | Kikuchi et al. | |

FOREIGN PATENT DOCUMENTS

| | | |
|---|---|---|
| CN | 1167311 | 12/1997 |
| CN | 1177172 | 3/1998 |
| CN | 1242575 | 1/2000 |
| CN | 1251461 | 4/2000 |
| CN | 1745579 | 3/2006 |
| CN | 101026775 | 8/2007 |
| EP | 0 677 954 | 4/1995 |
| EP | 0 725 541 | 8/1996 |
| EP | 0782338 | 7/1997 |
| EP | 0831647 | 3/1998 |
| EP | 0724264 | 12/1998 |
| EP | 0 898 279 | 2/1999 |
| EP | 0913822 | 5/1999 |
| EP | 1021048 | 7/2000 |
| EP | 1223580 | 7/2002 |
| EP | 1 229 542 | 8/2002 |
| EP | 1 608 165 | 12/2005 |
| EP | 1 868 190 | 12/2007 |
| JP | 6319125 | 11/1994 |
| JP | 8-265661 | 10/1996 |
| JP | 8-275205 | 10/1996 |
| JP | 8298554 | 11/1996 |
| JP | 8329004 | 12/1996 |
| JP | 8339663 | 12/1996 |
| JP | 09-081118 | 3/1997 |
| JP | 10-028273 | 1/1998 |
| JP | 10-210504 | 8/1998 |
| JP | 10-215409 | 8/1998 |
| JP | 11018048 | 1/1999 |
| JP | 11-185463 | 7/1999 |
| JP | 11-234622 | 8/1999 |
| JP | 11298860 | 10/1999 |
| JP | 2000-023082 | 1/2000 |
| JP | 2000-083216 | 3/2000 |
| JP | 2000-100073 | 4/2000 |
| JP | 2000-132953 | 5/2000 |
| JP | 2000-165361 | 6/2000 |
| JP | 2000-222861 | 8/2000 |
| JP | 2000-261802 | 9/2000 |
| JP | 2001-184839 | 7/2001 |
| JP | 2001-312880 | 11/2001 |
| JP | 2002-056651 | 2/2002 |
| JP | 2002-067533 | 3/2002 |
| JP | 2002-153684 | 5/2002 |
| JP | 2002-344805 | 11/2002 |
| JP | 2003-009096 | 1/2003 |
| KR | 10-1994-0038268 | 12/1994 |
| KR | 10-1992-0024627 | 12/1997 |
| KR | 2001-0111247 | 12/2001 |
| KR | 10-2002-0064463 | 8/2002 |
| RU | 2129758 | 4/1999 |
| WO | WO 97/06635 | 2/1997 |
| WO | WO 00/30357 | 5/2000 |
| WO | WO 00/30358 | 5/2000 |
| WO | WO 00/31980 | 6/2000 |
| WO | WO 00/36600 | 6/2000 |
| WO | WO 00/60598 | 10/2000 |
| WO | WO 2004/029960 | 4/2004 |
| WO | WO 2004/047430 | 6/2004 |
| WO | WO 2004/098193 | 11/2004 |
| WO | WO 2004/114658 | 12/2004 |
| WO | WO 2005/002220 | 1/2005 |
| WO | WO 2005/052941 | 6/2005 |
| WO | WO 2005/078727 | 8/2005 |

OTHER PUBLICATIONS

International Search Report for counterpart International Publication No. WO 2004/097824 dated Jun. 28, 2004.

"Digital Video Broadcasting (DVB); Subtitling Systems," Final Draft ESTI EN 300 743 v1.2.1 (Jun. 2002), pp. 1-48.

Office Action for counterpart Russian Application No. 2005132412/29 (036320) dated May 5, 2008.

Office Action for counterpart U.S. Appl. No. 10/673,210 dated Jun. 13, 2008.

Chinese Office Action dated Jun. 24, 2005.

Office Action for corresponding Canadian Application No. 2,468,867 dated Oct. 6, 2005.

Office Action for corresponding Russian Application No. 2004125872/28(028123) dated Sep. 21, 2007.

Office Action for counterpart Chinese patent application No. 20040018832.0 dated Aug. 1, 2008.

Office Action for counterpart Chinese patent application No. 200480018833.5 dated Aug. 1, 2008.

Search Report for counterpart European patent application No. 04737126.5-2223/1642284 dated Sep. 1, 2008.

P. Sarginson, "MPEG-2: A Tutorial Introduction to the Systems Layer," The Institution of Electrical Engineers, 1995, pp. 1-13.

Search Report for counterpart European patent application No. 04748368.0-2223/1642286 dated Sep. 1, 2008.

Office Action for U.S. Appl. No. 10/673,210 dated Jan. 6, 2010.

English translation of Office Action for Chinese patent application No. 200480011754.1 dated Feb. 27, 2009.

Office Action for Japanese patent application No. 2004-541315 dated Feb. 17, 2009.

English translation of Notice of Allowance for Russian patent application No. 2005132412/28(036320) dated Feb. 27, 2009.

English translation of Office Action for Chinese patent application No. 200710142513.6 dated Apr. 10, 2009.

Search Report for European patent application No. 03799199.9 dated May 26, 2009.

Office Action for Japanese patent application No. 2004-541314 dated Jun. 23, 2009 (with English translation).

Search Report for European patent application No. 03799198.1 dated Oct. 8, 2009.

Office Action for corresponding U.S. Appl. No. 10/488,347 dated Jan. 22, 2010.

Office Action for corresponding Japanese Application No. 2006-507814 dated Jan. 26, 2010 and English language translation thereof.

Office Action for corresponding Japanese Application No. 2006-507826 dated Apr. 30, 2010.

* cited by examiner

*BD-ROM*

Fixed Size Pallets

Fixed Size Pallets with 'NULL code

RECORDING MEDIUM HAVING A DATA STRUCTURE FOR MANAGING REPRODUCTION OF GRAPHIC DATA AND RECORDING AND REPRODUCING METHODS AND APPARATUSES

FOREIGN PRIORITY

The present invention claims priority under 35 U.S.C. 119 on Korean Application No. 10-2002-060256 filed Oct. 2, 2002; the contents of each above-cited Korean applications are incorporated by reference in their entirety.

BACKGROUND OF THE INVENTION

1. Field of the Invention

The present invention relates to a method of managing graphic data for a high-density recording medium such as an optical disk (e.g., a Blu-ray Disc ROM (BD-ROM)).

2. Description of Related Art

Recording media such as optical disks capable of recording large amounts of high-quality digital video/audio data, for example, DVDs (digital versatile disks) are now commercially available on the market. The types of DVDs include DVD-Video, DVD-VR (Video Recording), DVD-Audio, and DVD-AR (Audio Recording).

In the DVD-Video, graphic data to be reproduced in synchronization with a video/audio data stream is defined by the DVD-private format and designated as sub-pictures.

A sub-picture of the graphic data is of size 720×480 pixels and has a palette with 2-bit color depth, which can support up to 16 colors. The graphic data is recorded on the DVD after being multiplexed with the video/audio stream.

A run-length coding method according to the DVD-Video standard is applied to the graphic data in which display control information about sub-picture data is included. The display control information includes information on display timing, color change, blending ratio change, display position, size selection, etc.

Operations for providing various graphic effects to the graphic data, such as scroll-up/down, fade/wipe-in/out, and color change, can be performed selectively on a time basis. Navigation information for the palette information is defined for each title and program chain and includes information on 16 colors and the number and attributes of sub-pictures.

The attributes of sub-pictures may include caption information, director's comments, and aspect ratio information for various applications as well as coding mode information and language information.

An optical disk reproducing apparatus such as a DVD player displays the main video image and some or all of the graphic image of a sub-picture unit (SPU) as shown in FIG. 1 by blending the images using navigation information, wherein the graphic image of the sub-picture unit (SPU) is overlaid on the main video image on a presentation time basis.

As shown in FIG. 2, sub-picture packs (SP_PCKs) are recorded intermittently among audio packs (Audio_PCKs) and video packs (Video_PCKs) recorded successively. Each of the audio and video packs is of size 2048 bytes.

During data reproduction, the sub-picture packs are read and then grouped into a sub-picture unit (SPU), which includes a sub-picture unit header, pixel data, and display control information.

The sub-picture unit header includes the data size of the sub-picture unit. The pixel data includes 2-bit depth bitmap data encoded by the run-length coding method. The palette information for the pixel data is recorded as separate navigation information.

The optical disk reproducing apparatus reproduces the pixel data along with the audio and video data, the pixel data being synchronized with the audio and video data. As alluded to above, the apparatus displays the main video image and some or all of the graphic image of a sub-picture unit (SPU) by blending the images using the navigation information, wherein the graphic image of the sub-picture unit (SPU) is overlaid on the main video image in various ways on a presentation time basis.

The standardization for high-density read-only optical disks such as the Blu-ray disc ROM (BD-ROM) is still under way. A method for effective managing graphic data recorded on the high-density read-only optical disk such as a BD-ROM is not yet available.

SUMMARY OF THE INVENTION

The recording medium according to the present invention includes a data structure for managing reproduction of graphic data.

In one exemplary embodiment, a graphic information area of the recording medium includes at least one graphic image information segment and at least one palette information segment. Each palette information segment provides color information, and each graphic image information segment provides reproduction information for reproducing one or more graphic images.

In an exemplary embodiment, the reproduction information identifies a palette information segment to use in reproducing one or more graphic images. For example, each palette information segment may have an identifier, and the reproduction information identifies a palette information segment using the identifier for the palette information segment.

In another exemplary embodiment, the palette information segment includes a blending ratio indicating a level of opacity for the associated color information. In a further exemplary embodiment, the palette information segment includes a blending ratio indicating a level of transparency for the associated color information.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE EXEMPLARY EMBODIMENTS

In order that the invention may be fully understood, exemplary embodiments thereof will now be described with reference to the accompanying drawings.

Figure 3:
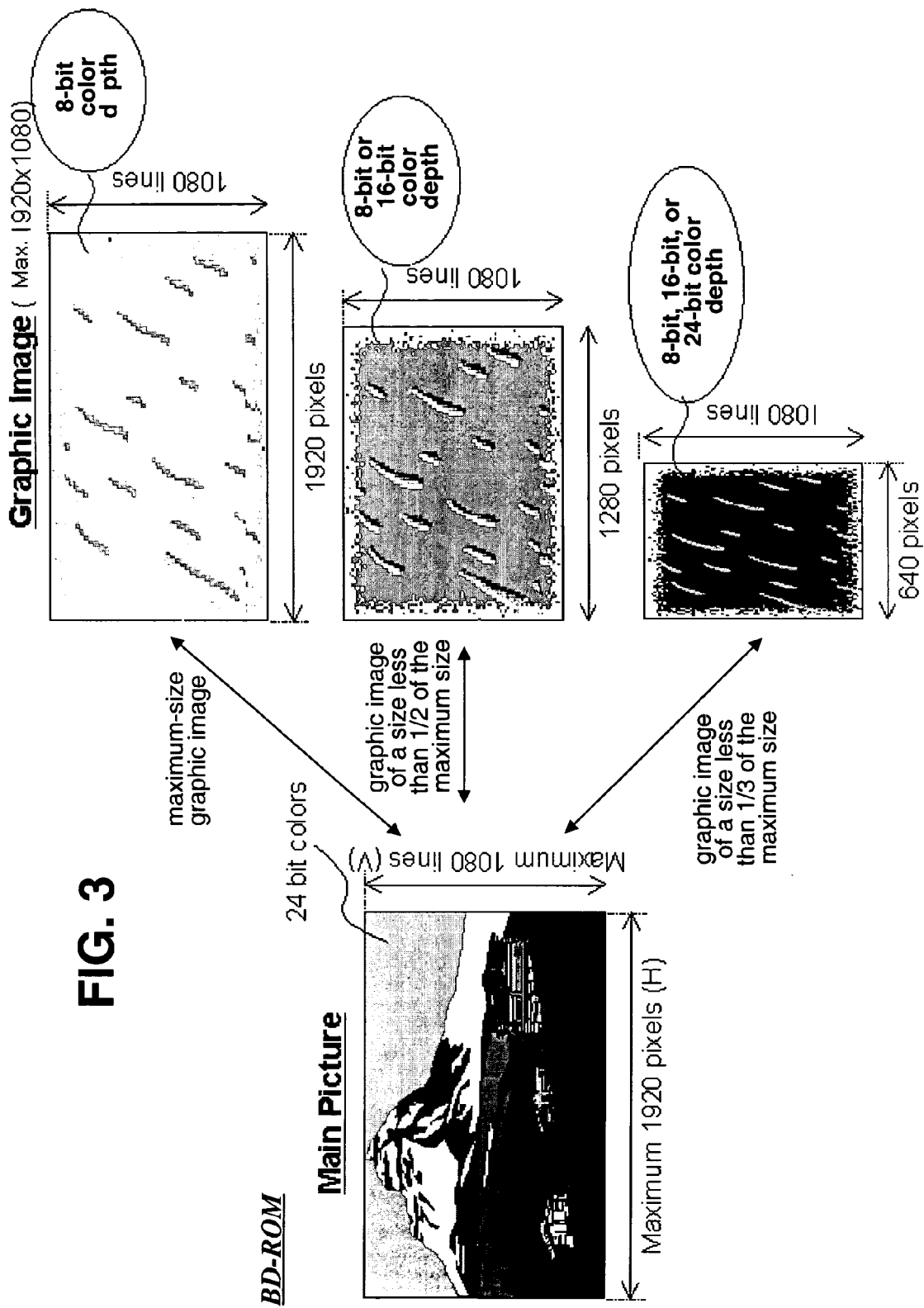
FIG. 3 illustrates a graphical representation of an embodiment of a method of managing graphic data for a high-density recording medium in accordance with the invention.

FIG. 3 is a graphical representation of an embodiment of a method of managing graphic data for a high-density recording medium such as an optical disk in accordance with the present invention. A main picture image has one or more corresponding graphic images, which have different sizes and color depths.

As shown, the main picture of size 1920×1080 pixels has three different associated graphic images, a graphic image of size 1920×1080 pixels, a graphic image of size 1280×1080 pixels, and a graphic image of size 640×1080 pixels.

The three graphic images have different color depths. The 1920×1080 graphic image has an 8-bit color depth, the 1280×1080 graphic image has an 8-bit or 16-bit color depth, and the 640×1080 graphic image has an 8-bit, 16-bit, or 24-bit color depth.

Figure 4:
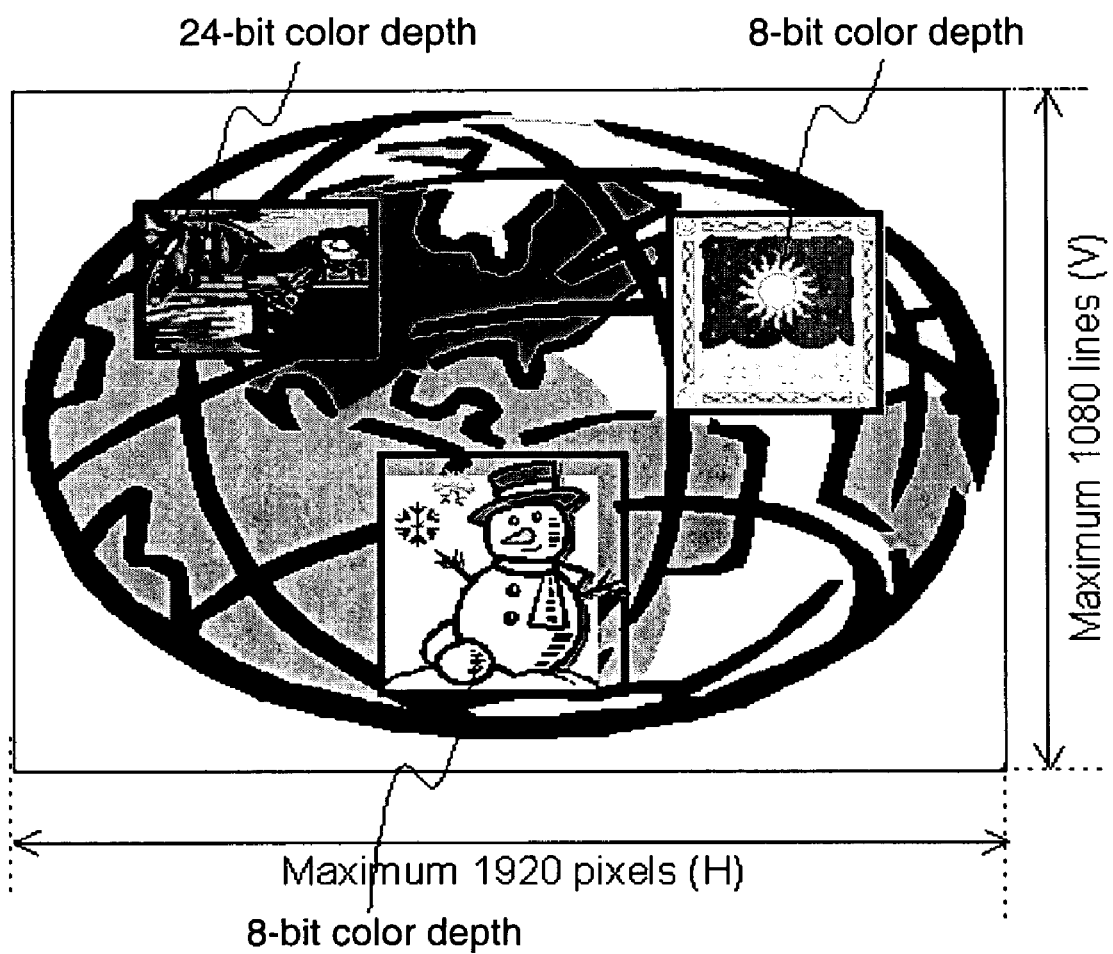
FIG. 4 illustrates a graphical representation of the main data overlaid with a plurality of graphic images of different sizes and color depths.

As shown in FIG. 4, a plurality of different graphic images may be simultaneously overlaid on one main picture image and the plurality of graphic images may have different sizes and color depths.

An optical disk reproducing apparatus determines the degree of importance of each graphic image to be overlaid based on the contents thereof and displays the graphic image with a color depth proportional to the degree of importance. For example, an image of the highest importance is displayed with 24-bit color depth, while an image of the lowest importance is displayed with 8-bit color depth.

Figure 5:
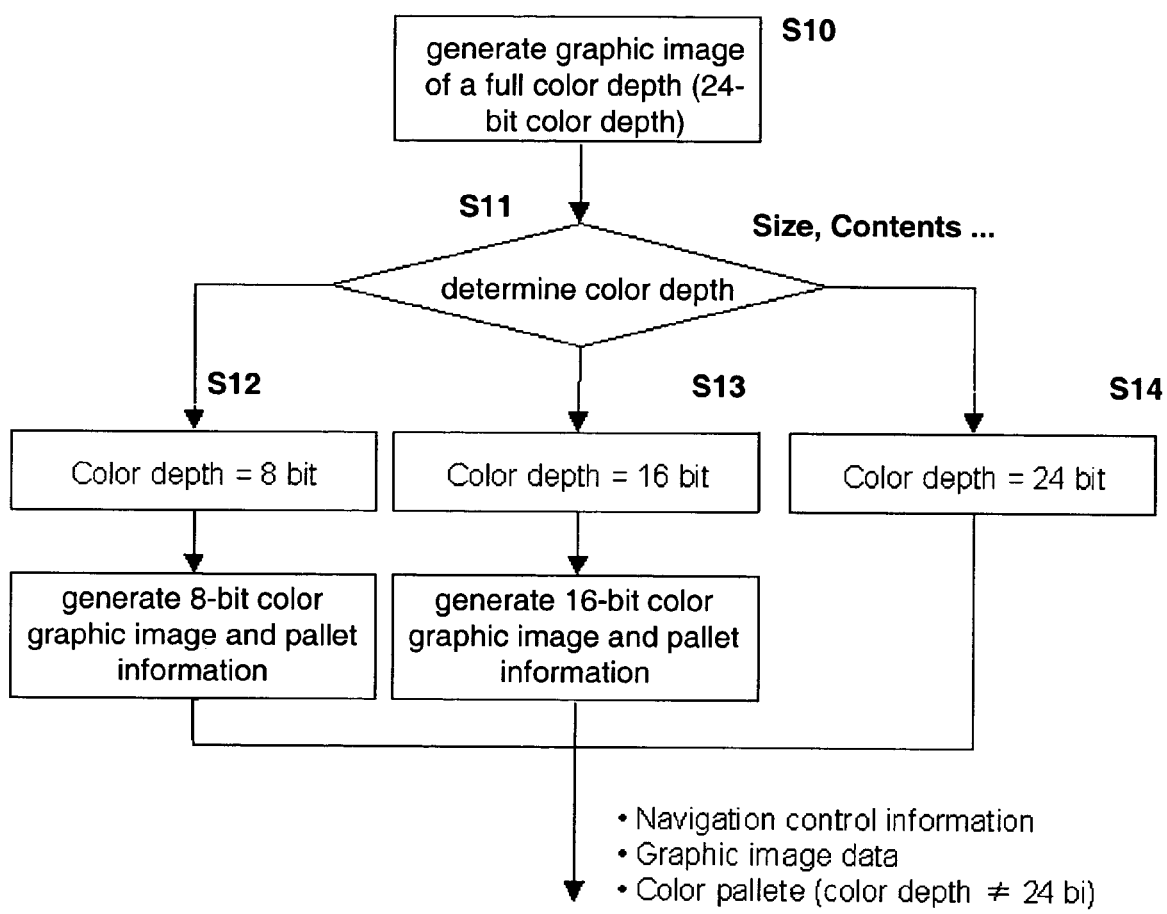
FIG. 5 is a flow diagram illustrating an embodiment of a method of managing graphic data in accordance with the invention.

In a flow diagram shown in FIG. 5, the optical disk reproducing apparatus generates a graphic image of a maximum color depth of 24 bits (S10) and adjusts the color depth for the graphic image depending on the degree of importance of the contents and size thereof (S11).

If 8-bit color depth is selected (S12), the optical disk reproducing apparatus generates an 8-bit color graphic image and palette information using corresponding navigation control information. Similarly, if 16-bit color depth is selected (S13), the optical disk reproducing apparatus generates a 16-bit color graphic image and palette information using corresponding navigation control information.

Figure 1:
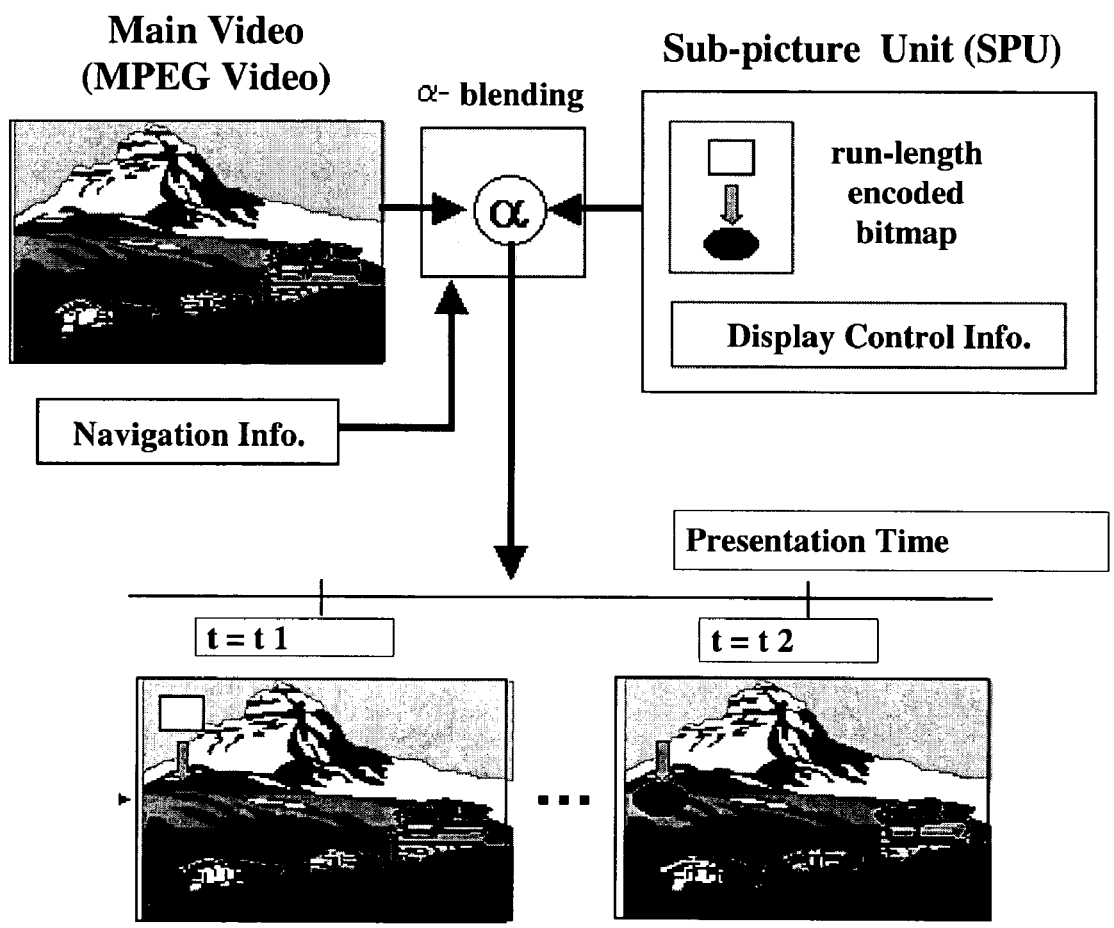
FIG. 1 illustrates a graphical representation of main video overlaid with graphic images according to the DVD-Video standard.
Figure 2:
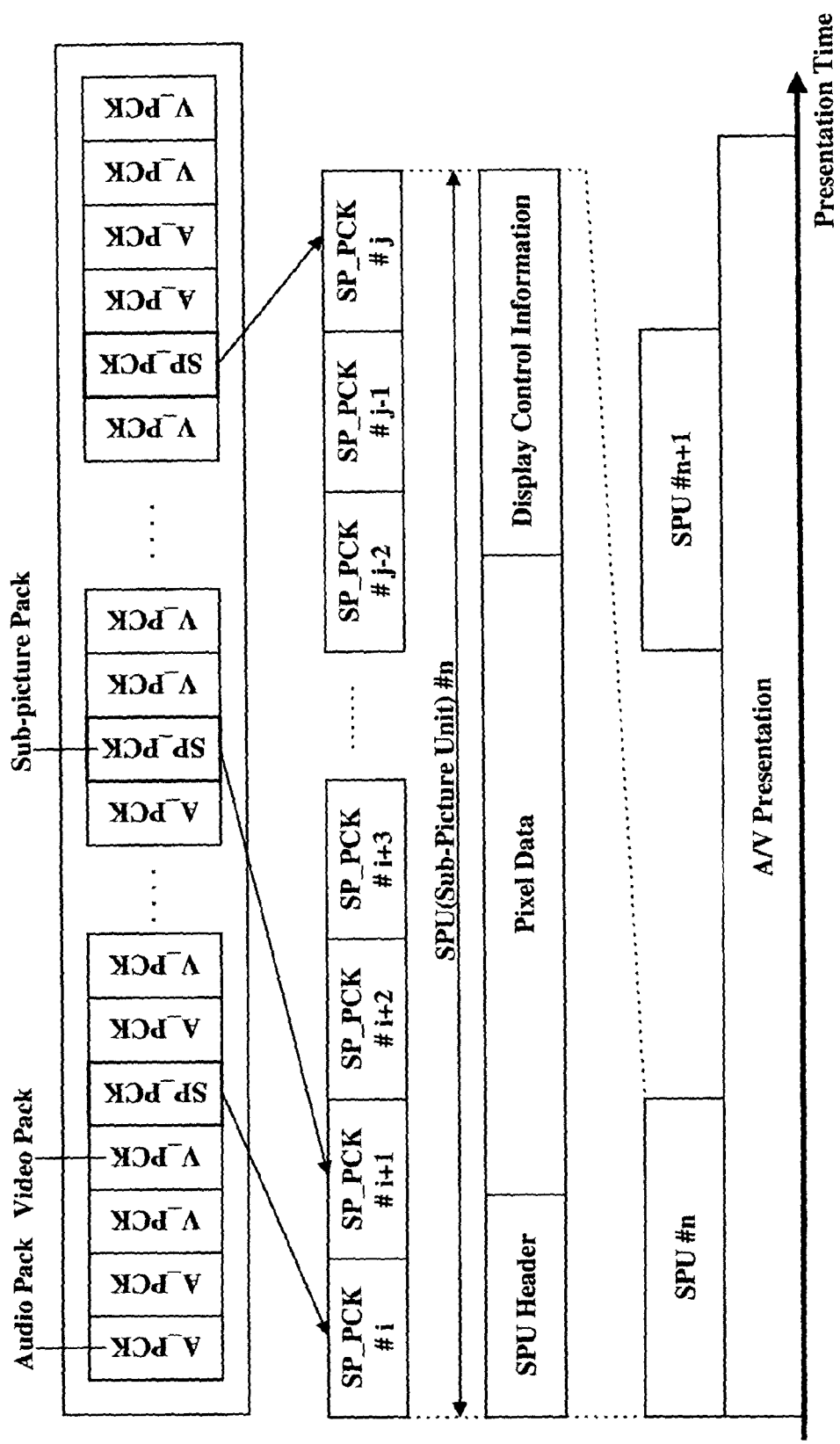
FIG. 2 illustrates a structure of graphic data in the DVD-Video standard.

If 24-bit color depth is selected (S14), the color depth of the graphic image generated at step S10 remains unchanged. The generated graphic image is displayed in various ways according to the display control information, as described above with reference to FIGS. 1 and 2.

In the case where only one color depth is used, the data size of a graphic image is large when a high color depth is used. On the other hand, the data size of a graphic image is small but the quality of the graphic image is deteriorated when a low color depth is used.

This drawback can be overcome by employing a variable color depth. In other words, the color depth of a graphic image is adjusted depending on the image size, bit rate, data amount, target application, or other conditions.

For example, the size of a graphic image is determined by the product of the numbers of horizontal and vertical pixels; therefore an image of size 720×480 pixels and an image of size 1440×240 pixels are regarded as being of the same size.

The number of pixels varies depending on the color sampling format (e.g., Y:Cb:Cr=4:4:4, 4:2:2, 4:2:0) and the bit rate of a graphic image may vary depending on the video quality, the number of audio streams, etc. The color depth can also be adjusted variably depending on these conditions.

In addition, because the contents of a graphic image differ from application to application, the color depth can be adjusted depending on the target application. All or one of these conditions can be used in determining the color depth of a graphic image. When multiple graphic images are linked to a main picture image, the multiple graphic images may have different color depths.

The size of a graphic image cannot exceed the size of the main picture image and the maximum possible color depth for the graphic image is 24 bits.

Figure 6:
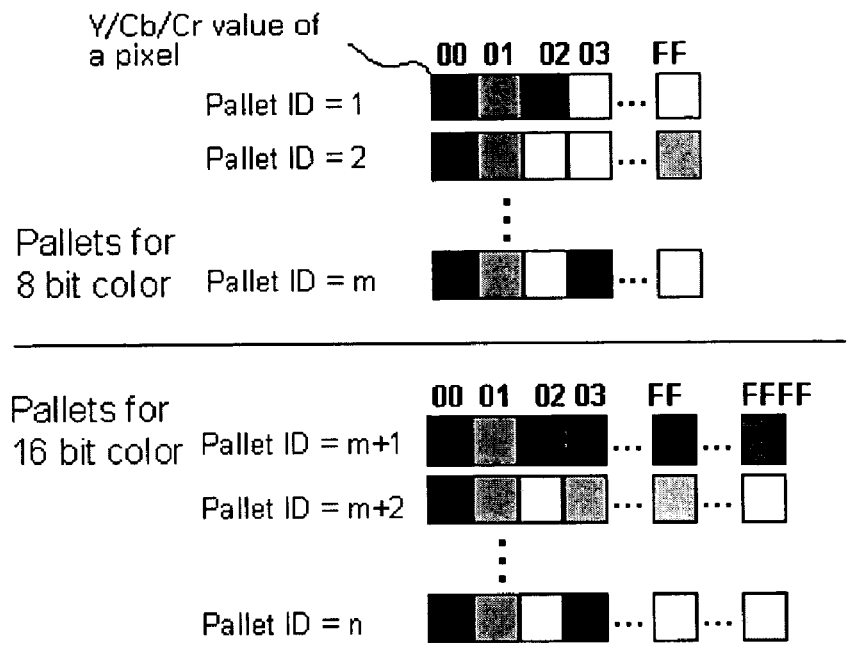
FIGS. 6-8 illustrate embodiments of palette information in accordance with the invention.

One embodiment of a method of managing graphic data for a high-density optical disk according to the present invention employs a multiple color palette structure in which multiple color palettes are defined in the navigation area and used for graphic images. In the multiple color palette structure, palettes are defined for each color depth that is less than 24 bits In the multiple color palette structure, fixed-size palettes as shown in FIG. 6 can be used, wherein every pixel value (e.g., R/G/B or Y/Cb/Cr) used in graphic images is defined in the palette information.

Figure 7:
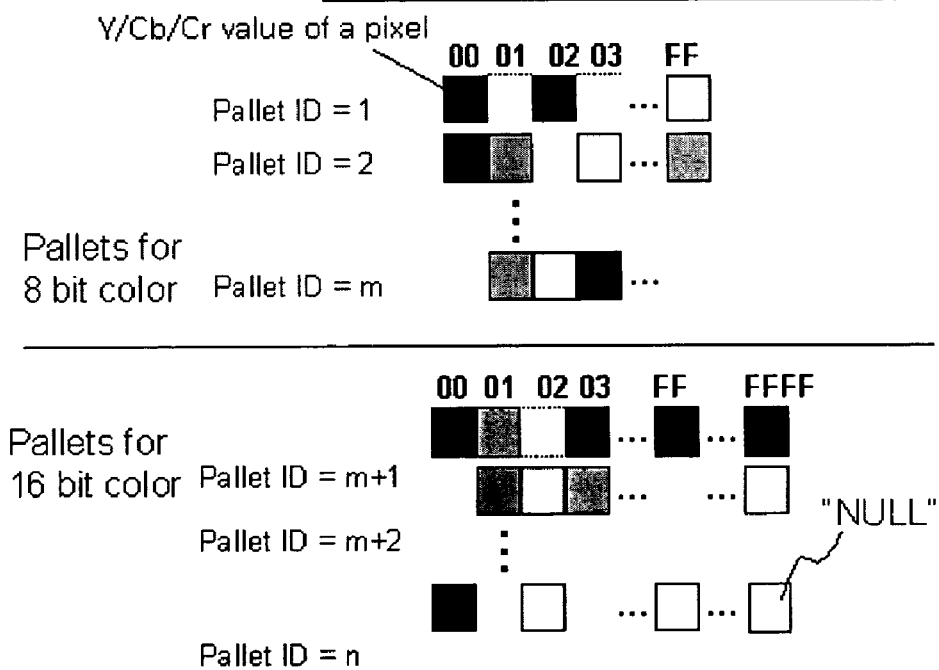

In the multiple color palette structure, fixed-size palettes with null code as shown in FIG. 7 can be used, wherein null code is assigned to every color value of the palettes that are not actually used in graphic images and thereby the size of palettes can be reduced.

Figure 8:
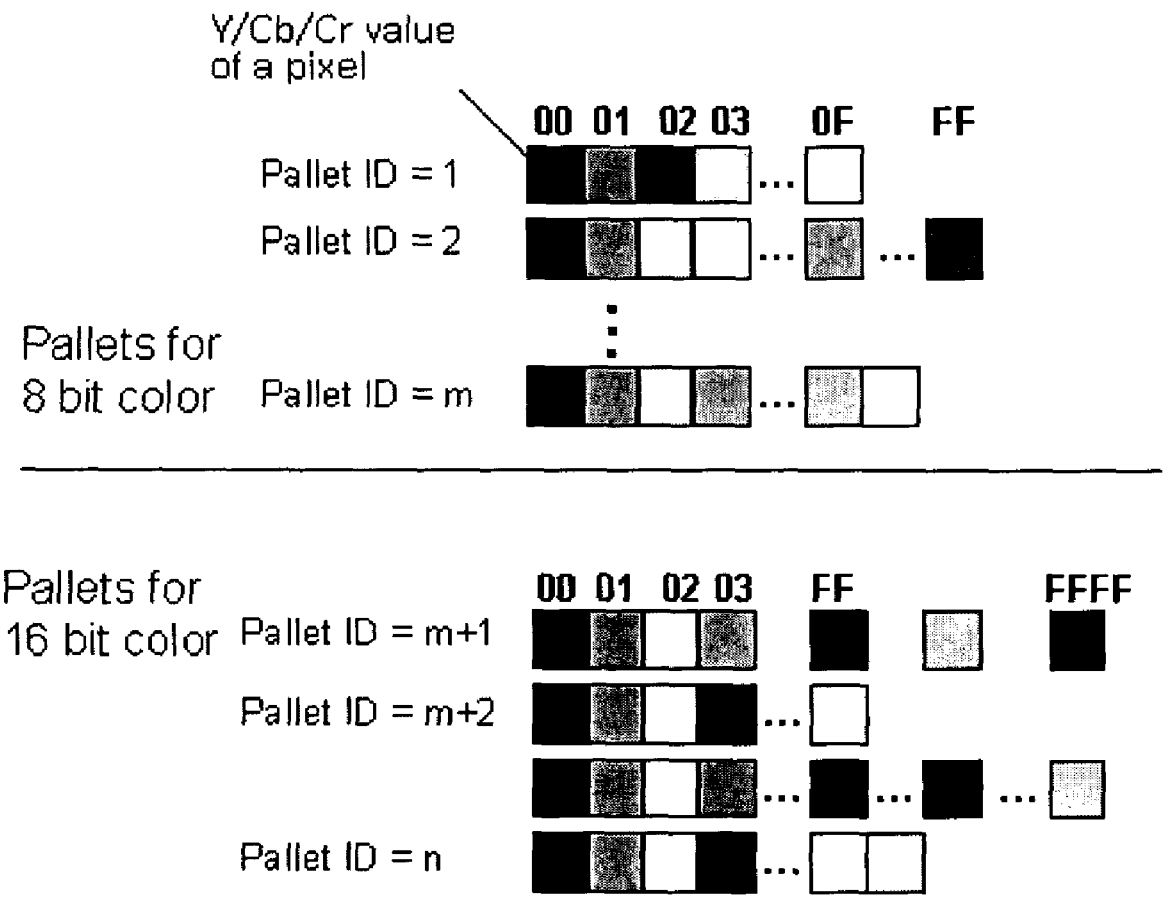

In the multiple color palette structure, variable-size palettes as shown in FIG. 8 can be used, wherein only the pixel values that are actually used in graphic images are defined in the palettes.

Palette search information such as a palette number, which points to a palette among the multiple palettes, is defined in each of graphic image information and thereby the palette information can be shared by multiple graphic images.

Figure 9:
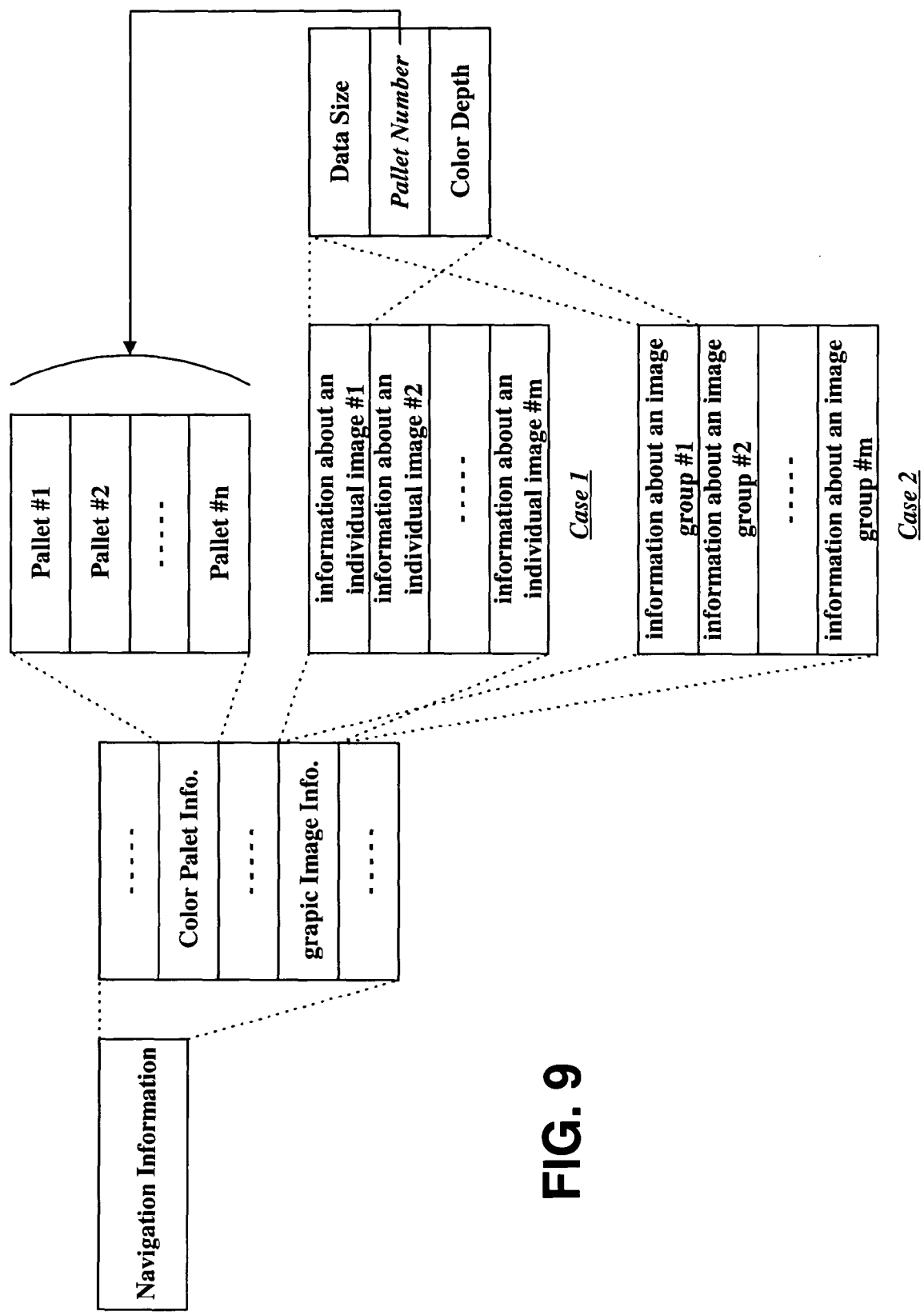
FIG. 9 illustrates an embodiment of the navigation information for graphic images recorded on a high density recording medium in accordance with the invention.

FIG. 9 illustrates a portion of the navigation information for graphic images recorded on a high density recording medium such as a BD-ROM. As shown in FIG. 9, for example, color palette information including multiple palettes and graphic image information about a plurality of individual graphic images are defined in the navigation information.

The graphic image information about a plurality of individual graphic images may include data size, palette number, and color depth for each graphic image. The palette number field may store one or more palette numbers so that the graphic image may be associated with more than one palette in the palette information.

As shown, the graphic image information may also include information about groups of graphic images instead of the information about a plurality of individual graphic images. This information may include the same graphic information as for individual graphic images. The palette information, however, may be shared by the groups of graphic images, thereby effectively reducing the size of palette information recorded on a high-density recording medium such as a BD-ROM.

In another embodiment of a method of managing graphic data for a high-density optical disk according to the invention, the main picture image is overlaid with graphic images by α-blending. If an individual blending ratio is assigned to each pixel value as done in the DVD-Video standard, the resultant data size becomes large. In this embodiment, therefore, all pixel values are divided into several pixel groups and a blending ratio is assigned to each pixel group.

Figure 10:
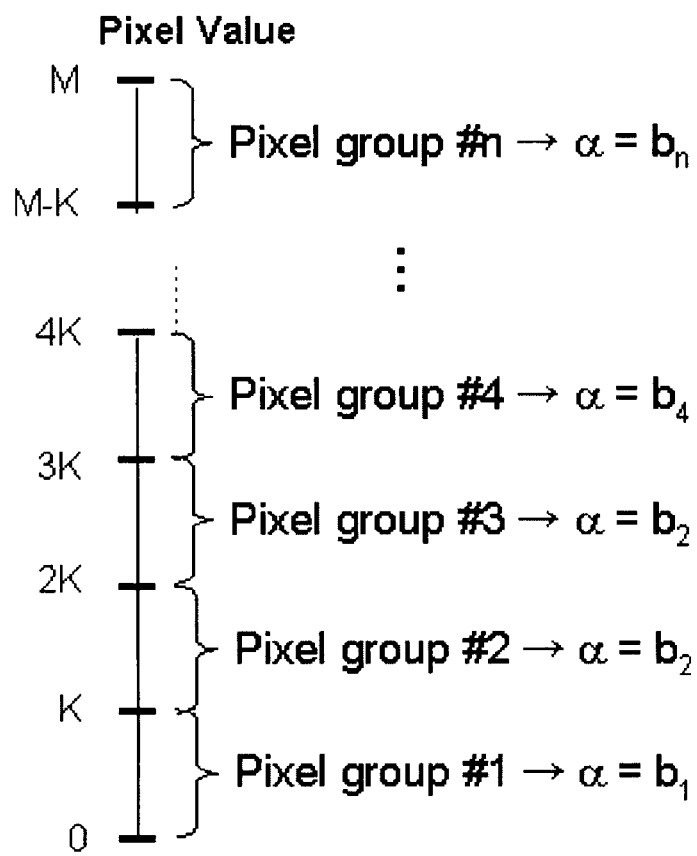
FIG. 10 illustrates exemplary pixel groups according to the invention.

As shown in FIG. 10, pixels having values equal to or less than M (e.g., 256) are divided into n groups and an individual blending ratio α (bn~b1) is assigned to each of the groups. The dividing task is performed based on pixel values or color properties.

The n groups may be obtained by dividing pixels at non-uniform intervals. An individual blending ratio may be assigned to each color palette (e.g., indicated as part of the palette information), each graphic image, each title of main video, or each playlist.

When each color palette is given a blending ratio, the blending ratio may be shared by a plurality of graphic images through the navigation information as described above with reference to FIG. 9.

Figure 11:
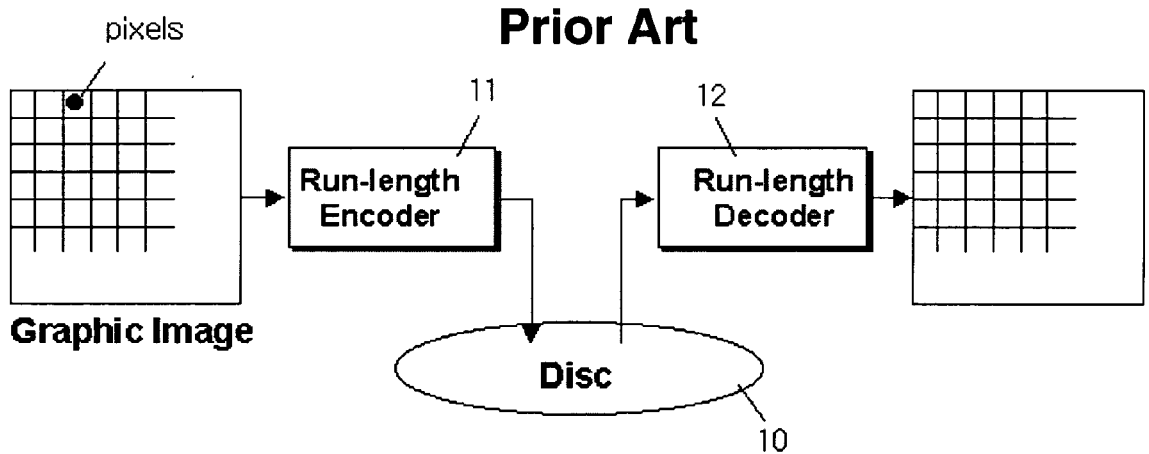
FIG. 11 illustrates a schematic diagram of an encoding/decoding apparatus using the graphic coding format of the DVD-Video standard.

The DVD-Video standard employs a general run-length coding method to reduce the data size of 2-bit color depth graphic images using a run-length encoder 11 and a run-length decoder 12, as shown in FIG. 11. In this case, the coding efficiency deteriorates as the color depth increases.

Figure 12:
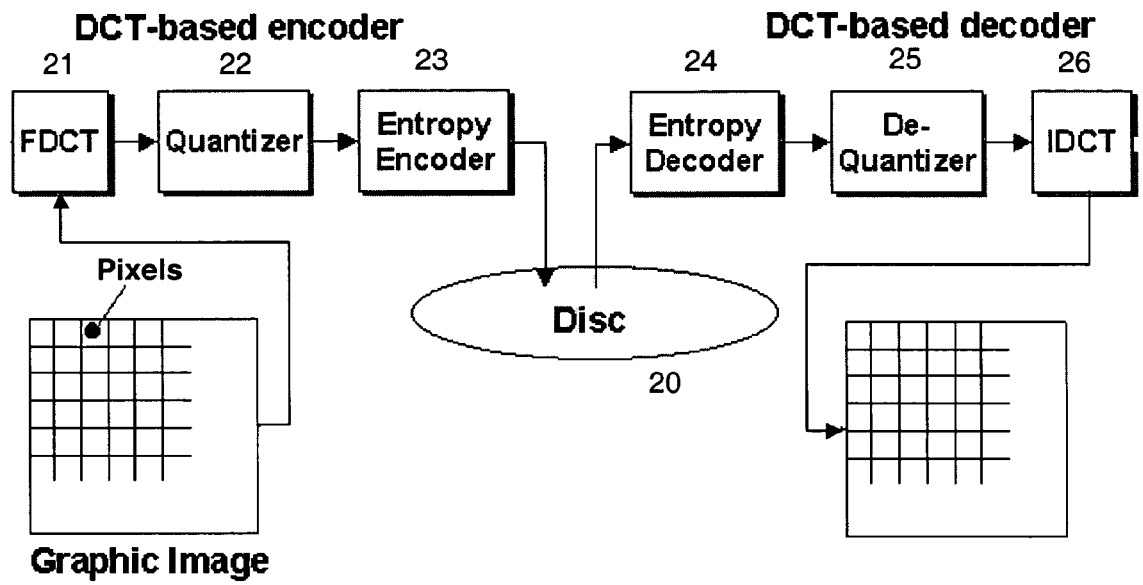
FIGS. 12 through 16 illustrate schematic diagrams of first through fifth embodiments of encoding/decoding apparatuses of the invention.

Consequently, a coding method suitable for a high-density optical disk is required. In a first embodiment of the invention shown in FIG. 12, a discrete cosine transform (DCT) method is used, wherein high-resolution graphic data is encoded with compression into JPEG images.

In this embodiment, high-resolution graphic data is recorded on a BD-ROM 20 in accordance with the JPEG format by a DCT-based encoder comprising a forward discrete cosine transform (FDCT) unit 21, a quantizer 22, and an entropy encoder 23 and JPEG graphic images are reproduced from the BD-ROM 20 by a DCT-based decoder comprising an entropy decoder 24, a dequantizer 25, and an inverse DCT unit 26.

In the case where a graphic image is encoded in accordance with the JPEG format, the graphic image is managed in a similar way that still images are recorded and managed. The FDCT unit 21 transforms a graphic image from the spatial domain to the frequency domain on an 8×8 block basis.

The quantizer 22 quantizes the data transformed to the frequency domain and the entropy encoder 23 removes spatial redundancy from the quantized data.

The entropy decoder 24, dequantizer 25, and IDCT unit 26 perform the reverse operations of the encoding process. The quantization and dequantization processes may be skipped to prevent information loss.

Figure 13:
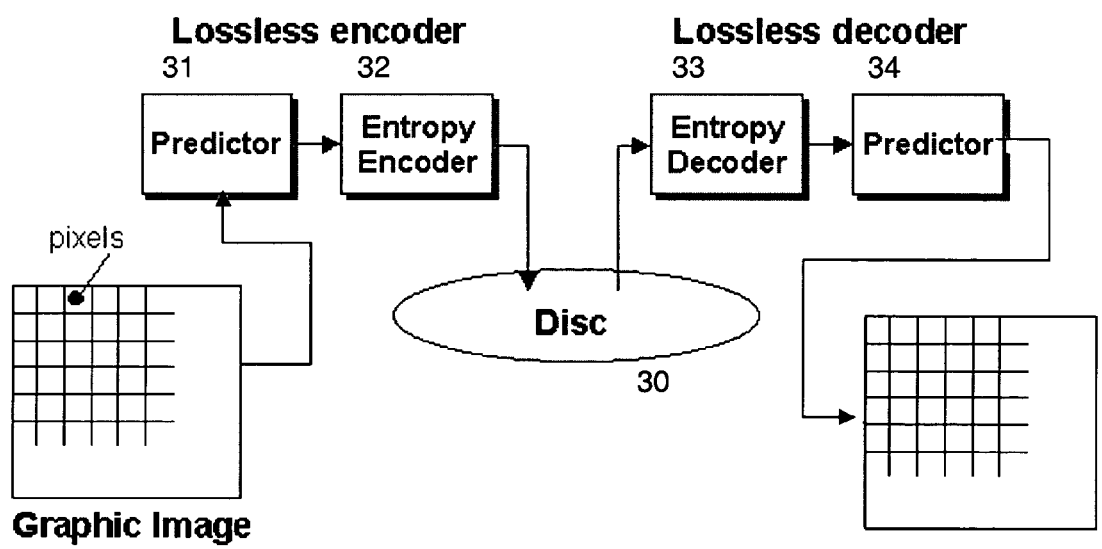

In a second embodiment of the invention shown in FIG. 13, a predictive coding method is used, wherein high-resolution graphic data is encoded with compression into JPEG images.

In this embodiment, high-resolution graphic data is recorded on a BD-ROM 30 in accordance with the JPEG format by a lossless encoder comprising a predictor 31 and an entropy encoder 32, and JPEG graphic images are reproduced from the BD-ROM 30 by a lossless decoder comprising an entropy decoder 33 and a predictor 34.

The predictor 31 calculates a prediction value of each pixel and codes the difference between the real value and the prediction value of each pixel. The predictors 31 and 34 may be constructed as a single module.

The entropy encoder 32 removes spatial redundancy from the data from the predictor 31. The entropy decoder 33 and predictor 34 perform the reverse operations of the encoding process. No information loss takes place during the encoding process or decoding process because quantization and dequantization are not included.

Figure 14:
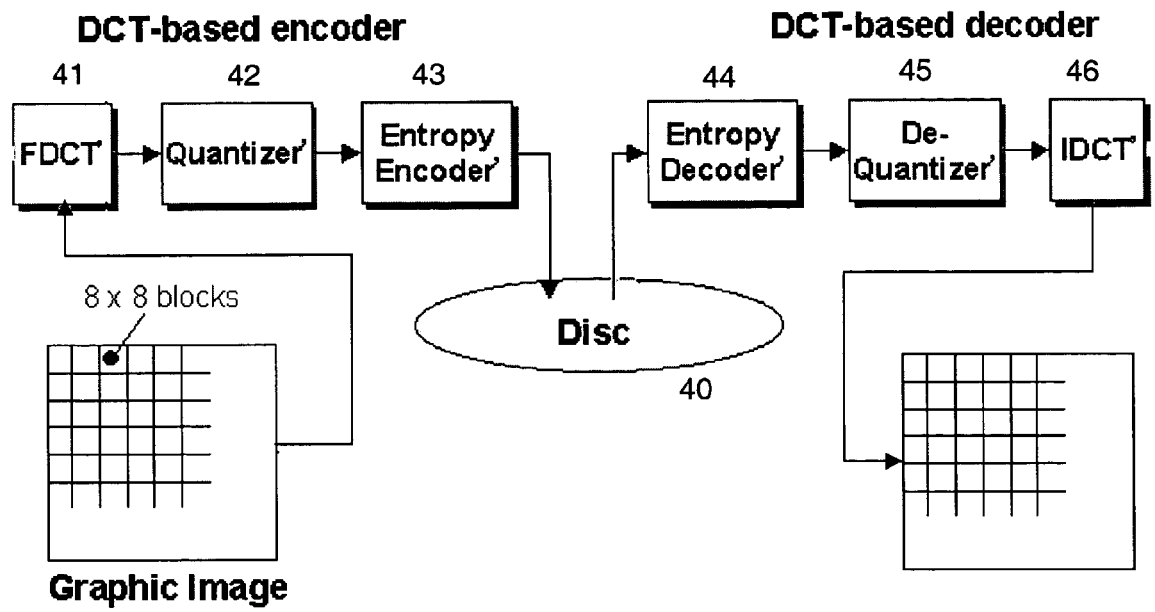

In a third embodiment of the invention shown in FIG. 14, a discrete cosine transform (DCT) method is used, wherein high-resolution graphic data is encoded in accordance with MPEG2 I-picture format.

As described above with reference to FIG. 12, high-resolution graphic data is recorded on a BD-ROM 40 in accordance with the MPEG2 I-picture format by a DCT-based encoder comprising a forward discrete cosine transform (FDCT) unit 41, a quantizer 42, and an entropy encoder 43 and MPEG2 I-picture formatted graphic images are reproduced from the BD-ROM 40 by a DCT-based decoder comprising an entropy decoder 44, a dequantizer 45, and an inverse DCT unit 46.

The MPEG2 I-picture format and JPEG format are similar in that both formats use DCT encoding/decoding. However, they use different quantization and entropy encoding tables. In addition, the bit stream syntaxes of the two methods are also different.

Figure 15:
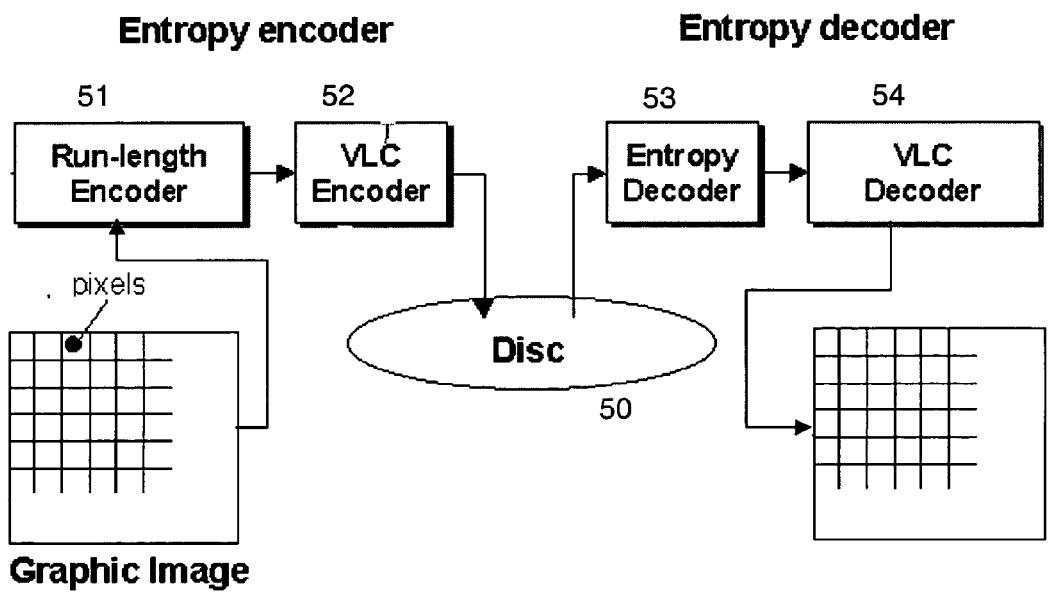

In a fourth embodiment of the invention shown in FIG. 15, a statistical coding method is used, wherein high-resolution graphic data is encoded by entropy coding.

In this embodiment, high-resolution graphic data is recorded on a BD-ROM 50 by an entropy encoding unit comprising a run-length encoder 51 and a variable length coding (VLC) encoder 52. Graphic images are reproduced from the BD-ROM 50 by an entropy decoding unit comprising an entropy decoder 53 and a VLC decoder 54.

In the case where successive pixels having the same value exist, the run-length encoder 51 reduces the data size by expressing the successive pixels by pixel value and its run-length. For example, pixels of '555533333333388888' are expressed by 5(3),3(9),8(5).

Based on the statistics of the run-length encoding results, the VLC encoder 52 assigns short-length codes to values of high frequency of appearance and long-length codes to values of low frequency of appearance. The Huffman encoding or arithmetic encoding method used in the MPEG or JPEG format may be employed.

Figure 16:
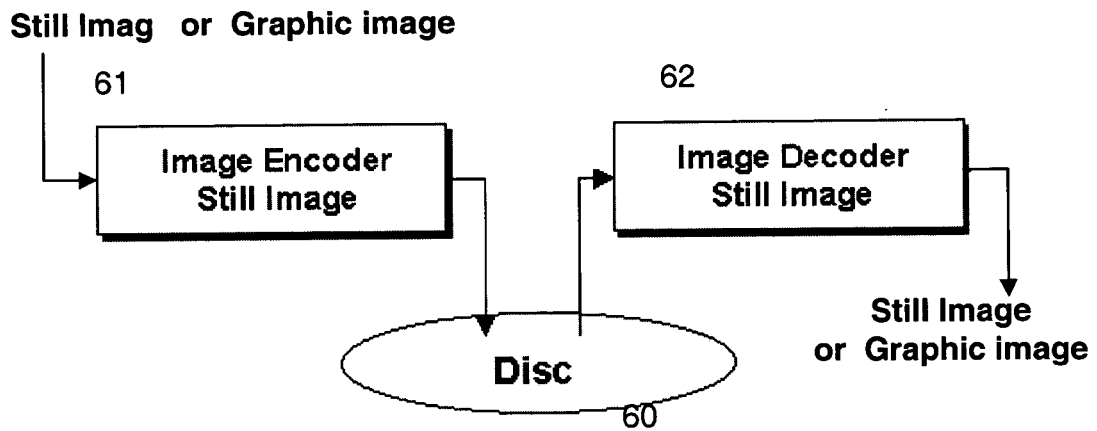

In a fifth embodiment of the invention shown in FIG. 16, high-resolution graphic data is encoded in accordance with a format identical to the still image coding format.

In this embodiment, high-resolution graphic data is recorded on a BD-ROM 60 and graphic images are reproduced from the BD-ROM 60 in accordance with the still image coding format.

In this case, the structure for stream decoding is relatively simple and a single image encoder and decoder are shared by still image processing and graphic image processing because graphic images and still images have the same format. The image encoder may be a JPEG encoder, MPEG2 I-picture encoder, etc.

Figure 17:
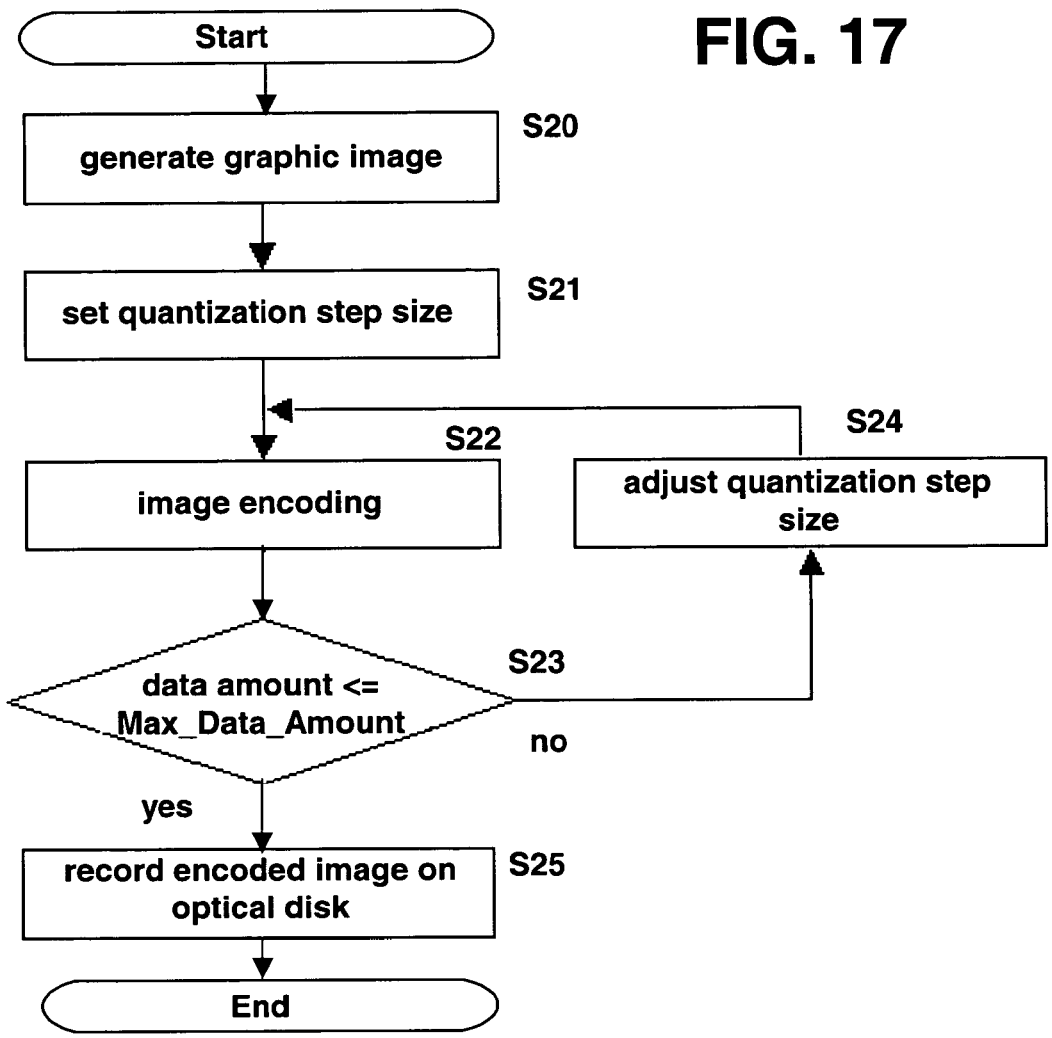
FIG. 17 is a flow diagram illustrating a method of limiting the data size of an encoded image in accordance with the invention.

In the first and third embodiments of the invention described above with reference to FIGS. 12 and 14, the quantization is performed according to a flow diagram illustrated in FIG. 17.

A graphic image is generated (S20) and a quantization step size is set (S21). The graphic image is encoded (S22) with the given step size, and the size of the encoded image is examined. If the size does not exceed a prescribed maximum data amount, the encoded image is recorded on the optical disk (S25); and otherwise, steps S22 and S23 are repeated after the quantization step size is adjusted (S24).

Figure 18:
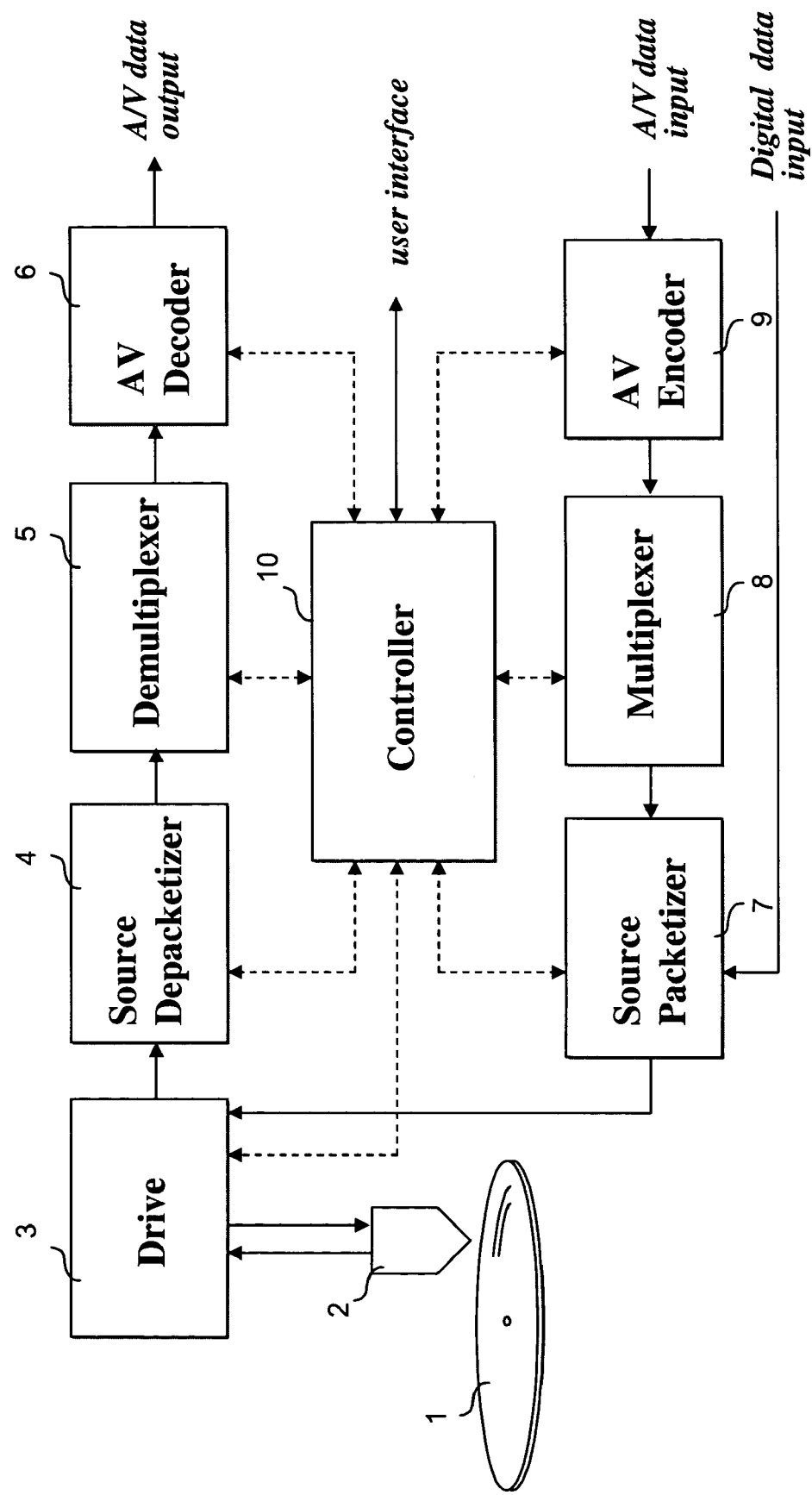
FIG. 18 illustrates a schematic diagram of an embodiment of an optical disk recording and reproducing apparatus according to the present invention.

FIG. 18 illustrates a schematic diagram of an embodiment of an optical disk recording and reproducing apparatus according to the present invention. As shown, an AV encoder 9 receives and encodes data (e.g., movie video and audio data, only audio data, and/or still image data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 18, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record the data structures of FIG. 9 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced based on the navigation information provided in a still information file.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 18 has been described as a recording and reproducing apparatus, it will be understood that only a recording or only a reproducing apparatus may be provided using those portions of FIG. 18 providing the recording or reproducing function.

The data structure of the high density recording medium for, and the methods and the apparatuses of, managing graphic data for a high-density optical disk in accordance with the invention allow high-resolution graphic images to be overlaid on main video reproduced from the high-density optical disk with various sizes and color depths.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium including graphic data and management information recorded by a recording device and configured to be reproduced by a reproduction device in a manner instructed by the management information, the recording medium comprising:
   at least one graphic image reproduction information segment, one or more graphic images and one or more palette information segments, each graphic image reproduction information segment providing reproduction information for reproducing one or more graphic images;
   wherein each palette information segment has a palette identifier identifying a palette and the at least one graphic image reproduction segment stores an indicator referring to the palette identifier for reproduction of the one or more graphic images,
   wherein each palette includes a plurality of elements, a value of each element is determined according to color attributes and one of levels of opacity, and the graphic image reproduction segment is separate from the palette information segment.

2. The recording medium of claim 1, wherein two or more graphic image reproduction information segments share a same palette information segment.

3. The recording medium of claim 1, wherein each pixel of the graphic image is correspondent to one of the elements of the palette referred using the palette identifier.

4. The recording medium of claim 1, wherein the palette includes 256 elements at maximum.

5. The recording medium of claim 1, wherein the palette is fixed size of 256 elements and the palette includes at least one null element.

6. The recording medium of claim 1, wherein the color attributes are luminance and chrominance (YCrCb).

7. A method of reproducing a data structure for managing reproduction of graphic data from a recording medium, comprising:
   reproducing at least one graphic image reproduction information segment, one or more graphic images and one or more palette information segments from the recording medium, each graphic image reproduction information segment providing reproduction information for reproducing one or more graphic images,
   wherein each palette information segment has a palette identifier identifying a palette and the at least one graphic image reproduction segment stores an indicator referring to the palette identifier, wherein each palette includes a plurality of elements, a value of each element is determined according to color attributes and one of levels of opacity, and the graphic image reproduction segment is separate from the palette information segment.

8. The method of claim 7, wherein each pixel of the graphic image is correspondent to one of the elements of the palette referred using the palette identifier.

9. The method of claim 7, wherein the palette includes 256 elements at maximum.

10. The method of claim 7, wherein the palette is fixed size of 256 elements and the palette includes at least one null element.

11. The method of claim 7, wherein the color attributes are luminance and chrominance (YCrCb).

12. An apparatus for reproducing a data structure for managing reproduction of graphic data from a recording medium, comprising:
a reproducing device configured to reproduce data recorded on the recording medium;
a controller configured to control the reproducing device to reproduce at least one graphic image reproduction information segment, one or more graphic images and one or more palette information segments from the recording medium, each graphic image reproduction information segment providing reproduction information for reproducing the one or more graphic images,
wherein each palette information segment has a palette identifier identifying a palette and the at least one graphic image reproduction segment stores an indicator referring to the palette identifier,
wherein each palette includes a plurality of elements, a value of each element is determined according to color attributes and one of levels of opacity and the graphic image reproduction segment is separate from the palette information segment.

13. The apparatus of claim 12, wherein the controller is configured to control the reproducing device to reproduce each pixel of graphic image, the each pixel of graphic image to be correspondent to one of the elements of the palette referred using the palette identifier.

14. The apparatus of claim 12, wherein the controller is configured to control the reproducing device to reproduce the palette, the palette including 256 elements at maximum.

15. The apparatus of claim 12, wherein the controller is configured to control the reproducing device to reproduce the palette, the palette to be fixed size of 256 elements with at least one null element.

16. The apparatus of claim 12, wherein the controller is configured to control the reproducing device to reproduce the color attributes, the color attributes to be luminance and chrominance (YCrCb).

17. A method of recording a data structure for managing reproduction of graphic data on a recording medium, comprising:
recording at least one graphic image reproduction information segment, one or more graphic images and one or more palette information segments on the recording medium, each graphic image reproduction information segment providing reproduction information for reproducing one or more graphic images;
wherein each palette information segment has a palette identifier identifying a palette and the at least one graphic image reproduction segment stores an indicator referring to the palette identifier,
wherein each palette includes a plurality of elements, a value of each element is determined according to color attributes and one of levels of opacity, and the graphic image reproduction segment is separate from the palette information segment.

18. The method of claim 17, wherein each pixel of the graphic image is correspondent to one of the elements of the palette referred using the palette identifier.

19. The method of claim 17, wherein the palette includes 256 elements at maximum.

20. The method of claim 17, wherein the palette is fixed size of 256 elements and the palette includes at least one null element.

21. The method of claim 17, wherein the color attributes are luminance and chrominance (YCrCb).

22. An apparatus for recording a data structure for managing reproduction of graphic data on a recording medium, comprising:
a recording device configured to record data on the recording medium; and
a controller configured to control the recording device to record at least one graphic image reproduction information segment, one or more graphic images and one or more palette information segments on the recording medium, each graphic image reproduction information segment providing reproduction information for reproducing the one or more graphic images;
wherein each palette information segment has a palette identifier identifying a palette and the at least one graphic image reproduction segment stores an indicator referring to the palette identifier,
wherein each palette includes a plurality of elements, a value of each element is determined according to color attributes and one of levels of opacity and the graphic image reproduction segment is separate from the palette information segment.

23. The apparatus of claim 22, wherein the controller is configured to record each pixel of graphic image, the each pixel of graphic image to be correspondent to one of the elements of the palette referred using the palette identifier.

24. The apparatus of claim 22, wherein the controller is configured to record the palette, the palette including 256 elements at maximum.

25. The apparatus of claim 22, wherein the controller is configured to record the palette, the palette to be fixed size of 256 elements with at least one null element.

26. The apparatus of claim 22, wherein the color attributes are luminance and chrominance (YCrCb).

* * * * *